Nov. 21, 1967     P. J. FELLNER, JR     3,353,652
FEEDING AND INDEXING DEVICE FOR PACKAGE HANDLING APPARATUS
Filed May 25, 1967     2 Sheets-Sheet 1
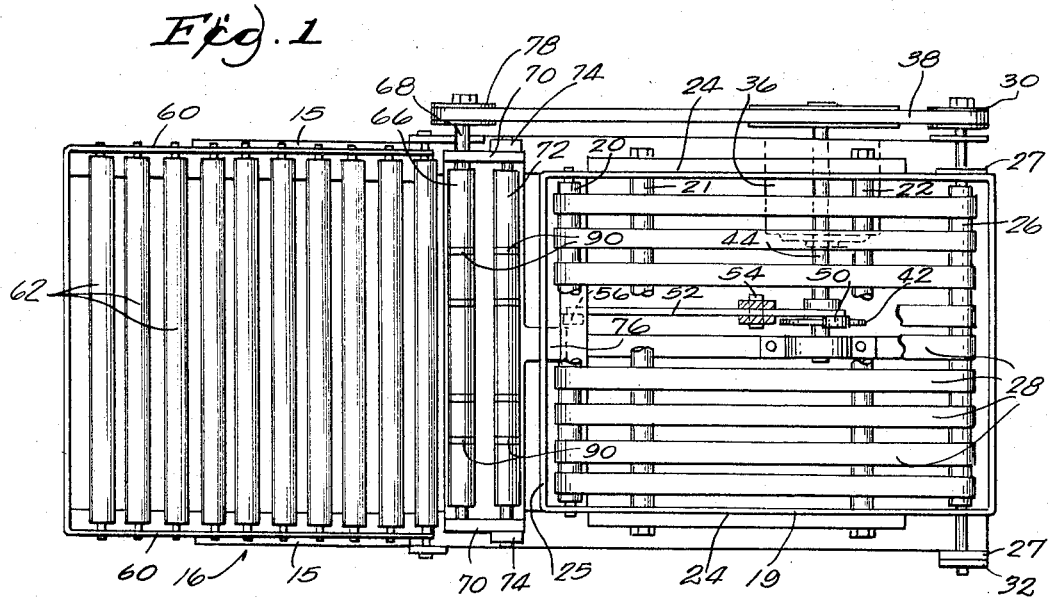
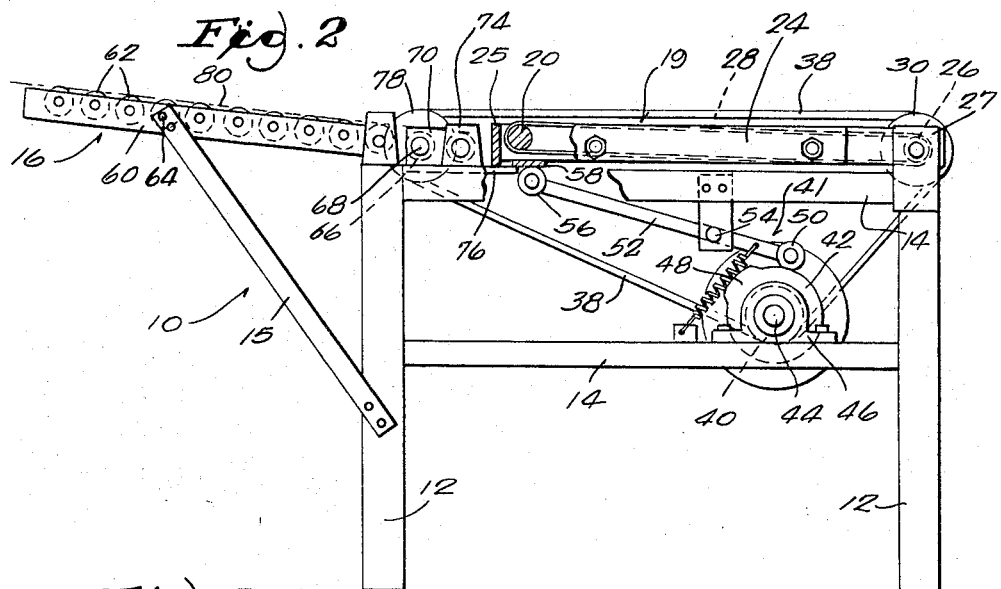
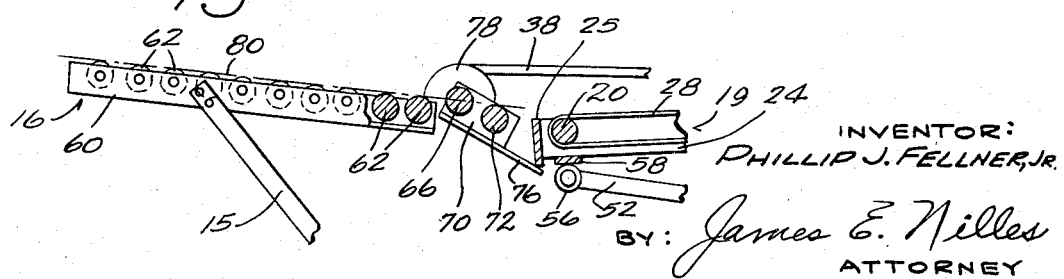
INVENTOR:
PHILLIP J. FELLNER, JR.
BY: James E. Nilles
ATTORNEY Nov. 21, 1967  P. J. FELLNER, JR  3,353,652
FEEDING AND INDEXING DEVICE FOR PACKAGE HANDLING APPARATUS
Filed May 25, 1967  2 Sheets-Sheet 2
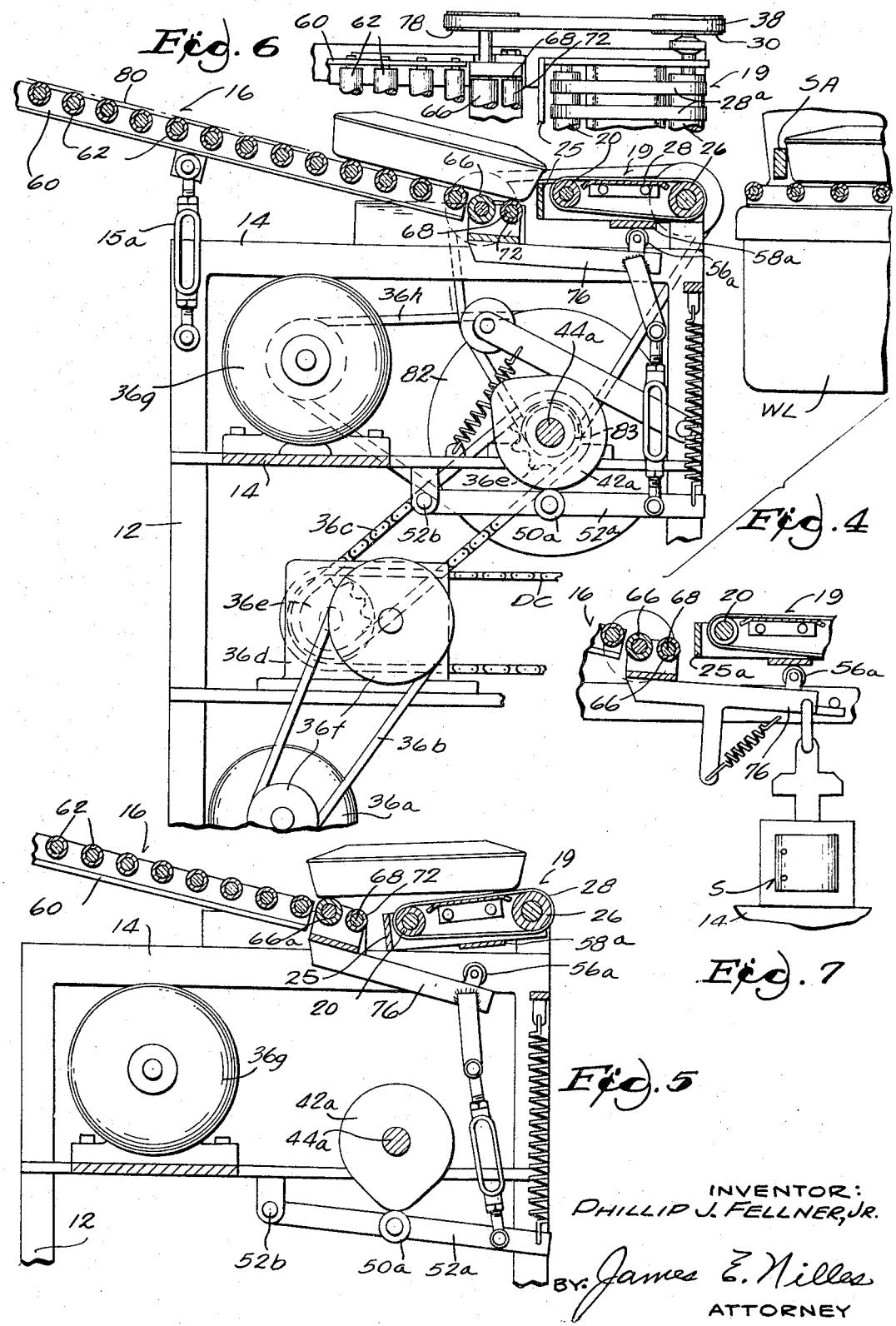
INVENTOR:
PHILLIP J. FELLNER, JR.
BY James E. Nilles
ATTORNEY United States Patent Office 3,353,652
Patented Nov. 21, 1967

3,353,652
FEEDING AND INDEXING DEVICE FOR PACKAGE HANDLING APPARATUS
Phillip J. Fellner, Jr., Racine, Wis., assignor to Sturtevant Industries, Inc., Sturtevant, Wis., a corporation of Wisconsin
Filed May 25, 1967, Ser. No. 641,280
8 Claims. (Cl. 198—34)

ABSTRACT OF THE DISCLOSURE

Package feeding mechanism between two conveyors which move the packages at different speeds and including stop means for preventing package transfer from one conveyor to the other, and also including positively driven means for insuring positive and quick movement of the package in timed relationship with movement of said stop means and only when the latter is not preventing package transfer.

Reference to related application

This is a continuation-in-part of the U.S. application Ser. No. 548,102 filed May 6, 1966, entitled "Indexing Device," which is now abandoned.

Background of the invention

The present invention pertains to conveyors, at least one of which is power-driven, for arranging and spacing articles on conveyors and having intermediate regulator means between the conveyors.

The prior art has used indexing devices of this general character, such as for example, the German patent of October 1926, No. 434,818, over which the present invention is an improvement. In that prior device, however, no provision was made for positively and quickly "kicking" or transferring the next package from a more slowly moving conveyor to a subsequent, more rapidly moving conveyor, and in fact those conveyors operated at similar speeds.

Semi-automatic wrapping machines have been used for a number of years to complete the wrapping of partially wrapped packages in order to increase the rate at which the packages are wrapped. The increased rate of wrapping resulted in the development of automatic weighing and labelling machines where the packages were previously weighed and labeled by hand. However, the rate of speed of a weighing machine is somewhat slower than the rate of speed of the wrapping machine due to the time required for the machine to record the weight on the package. An indexing device is considered necessary to coordinate the flow of packages from the wrapping machine to the weighing machine. This indexing device has also been found useful where packages are hand wrapped and stock piled and then are conveyed to the indexing mechanism which feeds them to the automatic labelling machine at a rate of speed coordinated to the rate of speed of the machine.

Summary of the invention

The present invention provides package feeding mechanism between two conveyors of different speeds and which coordinates the flow of packages therebetween. The invention includes stop means and also power driven means, both between the conveyors and so timed relative to one another that when the stop means is operative to prevent package transfer between the conveyors, the power driven means is also inoperative; and conversely when the stop means permits package transfer, the power driven means is operative to insure positive and rapid package transfer. Provision is made so that no damage or actual unwrapping of the package occurs because of the power driven means when the latter is not intended to "kick" or transfer the package.

Brief description of the drawings

FIGURE 1 is a plan view of an indexer made in accordance with the present invention, certain parts shown as being broken away or removed for clarity in the drawings;

FIGURE 2 is a side elevational view of the indexer shown in FIGURE 1, parts being shown as broken away and removed;

FIGURE 3 is an enlarged fragmentary view of the power driven roller shown in FIGURE 2 but when moved to the operative, raised position;

FIGURES 4 to 6 show another modification of the invention, FIGURE 4 being an elevational cross-sectional view similar to FIGURE 2, and showing certain parts in cross-section or as being broken away or removed, and showing the stop means in the package holding position;

FIGURE 5 is a view similar to FIGURE 4 but showing certain of the parts in a moved position and with other parts omitted;

FIGURE 6 is a fragmentary plan view of certain portions of the device as shown in FIGURE 4; and FIGURE 7 is still another modification and showing solenoid operated device rather than the cam operated device shown in FIGURE 5.

Description of the preferred embodiments

Generally, the invention provides a continuously rotating, powered conveyor shiftable between operative and inoperative positions. A first conveyor which may also be power driven, but which is shown as an inclined roller, gravity type conveyor, is aligned with the shiftable powered conveyor whereby packages will roll into abutting engagement with a stop bar on the end of the powered conveyor to hold the packages until the end of the powered conveyor is shifted to the operative position below the end of the roller type conveyor, at which time the lowest package will roll down the gravity conveyor onto the powered conveyor and will be moved rapidly away. A shiftable roller is provided adjacent the lower end of the gravity conveyor, and each time the powered conveyor shifts to the operative position, this shiftable roller engages the package and positively moves onto the powered conveyor. Then the powered conveyor and stop bar shift and prevent transfer of the next package, and simultaneously the drive roller moves to an inoperative position. Since the powered conveyor moves packages at a faster rate of speed than the gravity conveyor, the package is moved away from the gravity conveyor at a rate of speed sufficient to allow the package to be moved away from the other packages. The powered conveyor and its stop bar are then raised to prevent transfer of the next package.

FIGURES 1–3

Referring now to FIGURES 1 to 3 of the drawings, the improved indexer includes a base frame 10 having legs 12 supporting horizontal frame members 14. A roller type conveyor 16 is pivotally connected to the top of the base frame and is held in an inclined position by braces 15 so that it slopes downward toward a belt type conveyor 19. The angle of inclination of the belt type conveyor can be varied by changing the connection of the braces at the sides of the roller type conveyor as explained hereinafter.

The belt type conveyor includes a number of roller shafts 20, 21 and 22 pivotally connected to side members 24 with a drive roller 26 mounted at one end of the side members with its ends projecting through the side members so that they can be pivotally mounted in the frame members 27. A number of belts 28 are positioned on roller shaft 20 and drive roller 26 with a slight tension in the belts so that they stay tight on the rollers and rotate with the drive roller. The belt type conveyor is free to pivot on the axis of drive roller shaft 26 with the opposite end of the belt type conveyor being movable with respect to the lower end of the inclined roller type conveyor. A sheave 30 is secured to one of the drive roller shaft and a lock washer 32 is secured to the other end to hold the drive roller in position on the frame. A stop bar 25 is secured to the ends of side members 24 to prevent packages from being pulled up on the belt type conveyor when it is in the raised position.

The belt conveyor is driven by a variable speed motor 36 mounted on the lower cross members 14. A belt 38 is wound around motor sheave 40 and drive roller sheave 30 to allow for continuous rotation of the belt conveyor.

The belt conveyor is reciprocated from an inoperative position (FIGURE 2) to an operative position (FIGURE 3) by a cam and lever arrangement 41 located beneath the conveyor. The cam and lever arrangement includes a cam 42 mounted on shaft 44 which is mounted in bearings 46 on the lower support members 14 and is driven by the motor 36. A lobe 48 is provided on the surface of the cam and acts against a cam roller 50 on the end of lever arm 52 which is pivotally mounted on pin 54 on the frame. A cam roller 56 is secured to the other end of the lever arm and acts against cross bar 58 secured to the bottom of the frame members 24. Each time the cam makes a complete revolution, the end of the conveyor will be dropped once to the operative position and then raised to the inoperative position while a package is moved off of the belt type conveyor.

The inclined roller type conveyor includes a pair of frame members 60 having a number of free mounted rollers 62 mounted in a parallel relation between the frame members. A number of pins 64 are secured to the ends of the rollers on the outer side of the frame members for engagement with the brace 15. By moving the brace from one pin to the next, it is possible to change the angle of inclination of the roller type conveyor.

In order to be sure that the package on the inclined conveyor is moved onto the belt type conveyor, a continuously rotating drive roller 66 is provided along the lower end of the inclined conveyor. The drive roller shaft 68 is mounted for rotation in a pair of side arms 70 which are rigidly connected to the ends of a support roller 72. The support roller is pivotally mounted in frame members 74 and has an actuating arm 76 secured to its lower side extending beneath the cross arm 58. A sheave 78 is secured to the end of the drive roller shaft 68 and belt 38 is wound around it so that it will rotate at the same speed as the belt conveyor.

The drive roller in its inoperative position lies below a plane (represented by dotted line 80) so that it will not engage the bottom of the package that may be resting against the stop bar. When the conveyor is dropped to its operative position, the cross bar will engage the actuating arm pivoting the support roller and raising the drive roller above the plane designated by dotted line 80. If a package is resting on the roller type conveyor, the drive roller will engage the bottom surface of the package and give it an initial start in the direction of the belt type conveyor. If it is deemed necessary to provide greater friction between the drive roller and the bottom of the package, rubber O-rings 90 can be positioned on the drive roller to obtain the greater friction.

FIGURES 4–6

In this embodiment of the invention, parts like those in FIGURES 1 to 3 have been correspondingly referenced, or generally similar parts are suffixed with the letter "a." Therefore, a complete detailed description is not believed to be necessary or desirable. In FIGURES 4 to 6, the gravity conveyor 16 feeds to a powered, faster moving conveyor 19, the latter of which is simply shorter in length than that of FIGURES 1 to 3, and generally forms a continuation of the inclined, gravity conveyor 16. Conveyor 19 then delivers the package to a weighing and labeling machine WL where they are moved by a sweep arm SA, as shown and described in the co-pending U.S. application Ser. No. 538,131, filed Feb. 23, 1966, entitled "Automatic Label Applying Machine." The drive power for such a labeling machine may also be from motor 36a, via drive chain DC.

In the FIGURES 4 to 6 embodiment, power means are also provided for causing the shifting of one end including the stop means 25 of the powered conveyor between an inoperative, raised position and a lower operative position for receiving a package. This power means is also operatively associated with the drive roller 66 for causing shifting thereof between positions above and below the package carrying plane of the gravity conveyor.

This power means includes the power driven cam 42a fixed on shaft 44a which in turn is driven from an electric motor 36a via suitable endless drive members 36b, 36c, gear reducer 36d and appropriate sprockets 36e and pulleys 36f. The pivoted linkage which operatively connected the cam with the drive roller 66 and powered conveyor 19, includes link 52a, pivoted at 52b to the frame and having a cam follower 50a thereon, and arm 76 to which rollers 66 and 72 are connected and which pivots about shaft 68. Arm 76 also carries a roller 56a which abuts against member 58a of the powered conveyor so as to raise the latter to the inoperative, package stopping position when the cam 42a permits upward movement of the arm 76.

Another electric motor 36g continually drives rollers 26 and roller 66 through the belt 38, a large pulley 82 and smaller sheave 83 both freely rotatably together as a unit on shaft 44a, and belt 36h.

As shown in FIGURE 5, the second conveyor is shown in the position to which it drops initially to permit the package to move onto it, and the driving of the belts then may cause the conveyor 19 to raise against the bottom of the package for good contact therewith.

Instead of the belt-type conveyor 19 shown, this second conveyor may of course be of other type, such as one having driven rollers, raddles, or other types.

FIGURE 7

This embodiment is generally similar to the other figures except that the power means includes an electrically operated solenoid S instead of a driven cam. The solenoid is pivotally connected between link 76 and the machine frame.

Résumé

In operation, the packages are placed on the upper end of the inclined conveyor and allowed to roll freely to the bottom of the conveyor into abutting engagement with the stop bar. Each time the cam makes a complete revolution, or the solenoid is engaged, the end of the powered conveyor drops down, and the drive roller is raised. The package on the conveyor is in abutting engagement with the stopping bar and will be moved onto the powered conveyor by the drive roller. The packages on the powered conveyor will be moved rapidly to the next device and at a rate sufficient to leave a gap between the next package on the inclined conveyor and the package on the powered conveyor since the packages on the inclined conveyor move by gravity. The stop will then be raised to the inoperative position which allows the drive roller to also drop to its inoperative position. The next package will slide down the conveyor and abut the stop bar.

What is claimed is:

1. A package indexing device comprising: a frame; an inclined conveyor mounted on the top of the frame; a belt-type conveyor mounted on the frame at the lower end of the inclined conveyor to form a continuation thereof; said belt-type conveyor having one end movable from an inoperative position above said inclined conveyor to an operative position with respect to said inclined conveyor; cam means for moving the end of the moving conveyor adjacent the lower end of the inclined conveyor from the inoperative position to the operative position substantially in alignment with the end of the inclined conveyor to thereby remove one package at a time from the inclined conveyor; stop means secured to the end of the moving conveyor adjacent the inclined conveyor to prevent the package on the inclined conveyor from coming into contact with the moving conveyor when in the inoperative position; a drive roller assembly including a drive roller positioned at the lower end of the inclined conveyor, said assembly being mounted for pivotal motion to move the drive roller from a position below the plane of the conveyor to a position above the plane of the conveyor to impart an initial motion of the lowest packages on the inclined conveyor when the belt type conveyor is moved to the operative position; and drive means for continuously driving the cam means and the drive roller; said stop means operatively engaging the drive roller assembly to move the drive roller to the position above the plane of the inclined conveyor when the stop means moves to the inoperative position.

2. An indexing device according to claim 1 wherein said stop means comprises a bar mounted in a parallel relation across the end of the belt-type conveyor to prevent articles on the inclined conveyor from engaging the belt-type conveyor when the belt-type conveyor is in the inoperative position.

3. A package indexing device comprising; a frame; a first conveyor mounted on the frame for feeding packages; a powered conveyor mounted on the frame and at the lower end of the first conveyor to form a continuation thereof; said powered conveyor having one end movable from an inoperative position above said lower end of said first conveyor to an operative position with respect to said first conveyor; stop means connected with said powered conveyor to prevent a package on the first conveyor from coming onto the powered conveyor when the latter is in the inoperative position; a drive roller positioned at the lower end of the first conveyor and mounted for shifting from an inoperative position below the package carrying plane of the first conveyor to a position above said plane where it can impart an initial motion to said package on the first conveyor; power means operatively associated with both said powered conveyor and said drive roller for causing shifting of said one end of the powered conveyor between said inoperative position and said operative position in respect to the first conveyor to thereby remove one package at a time from the first conveyor, said power means also simultaneously causing shifting of said roller to said position above said plane of the first conveyor to engage a package when said powered conveyor moves to said operative position.

4. A device as set forth in claim 3 further characterized in that said power means includes a rotatable cam, and linkage operatively connecting said cam with said drive roller and powered conveyor for simultaneoulsy actuation thereof.

5. A device as set forth in claim 3 further characterized in that said powered conveyor is of the endless belt-type.

6. A device as set forth in claim 4 further characterized in that said powered conveyor is of the endless belt-type.

7. A device as set forth in claim 3 furthed characterized in that said power means includes an electrically operated solenoid, and linkage operatively connecting said solenoid with said drive roller and powered conveyor for simultaneous actuation thereof.

8. A device as claimed in claim 3 further characterized in that said first conveyor is of the inclined, gravity feed type.

References Cited

UNITED STATES PATENTS

| 3,058,564 | 10/1962 | Kubat | 193—35 |
| 3,182,785 | 5/1965 | Tourtellotte | 198—127 |

RICHARD E. AEGERTER, *Primary Examiner.*